June 28, 1966 F. E. RUEGSEGGER 3,257,699
DRAG TROWELING ARRANGEMENT FOR USE IN LINING OF CONDUITS
Filed April 6, 1965 8 Sheets-Sheet 4

June 28, 1966   F. E. RUEGSEGGER   3,257,699
DRAG TROWELING ARRANGEMENT FOR USE IN LINING OF CONDUITS
Filed April 6, 1965   8 Sheets-Sheet 5

June 28, 1966  F. E. RUEGSEGGER  3,257,699
DRAG TROWELING ARRANGEMENT FOR USE IN LINING OF CONDUITS
Filed April 6, 1965  8 Sheets-Sheet 8

Fig. 15.

United States Patent Office 3,257,699
Patented June 28, 1966

3,257,699
DRAG TROWELING ARRANGEMENT FOR USE
IN LINING OF CONDUITS
Frank E. Ruegsegger, Pompton Lakes, N.J., assignor to
Raymond International Inc., New York, N.Y., a corporation of New Jersey
Filed Apr. 6, 1965, Ser. No. 446,060
12 Claims. (Cl. 25—38)

This invention relates to improved drag troweling arrangements adapted to be drawn through pipes, conduits or the like for troweling and rendering smooth, lining material such as mortar in plastic condition shortly after such lining material has been lodged in place on the interior surfaces of the pipe, this application comprising a continuation-in-part of applicant's application Serial No. 367,021, filed May 13, 1964 entitled Drag Troweling Arrangement for Use in Lining of Conduits.

An alternative embodiment involving features similar to certain of those of the present application, is disclosed and claimed in applicant's co-pending application Serial No. 362,361, filed April 24, 1964.

While various forms of drag troweling arrangements for this purpose have become available, such constructions have continued to present certain difficulties, particularly with respect to their adaptability dependably to produce uniform and quite smooth mortar linings in various sizes of pipe, and particularly in cases where the apparatus may be designed for use in pipes having a predetermined nominal inside diameter, and yet the actual inside diameter may vary in different pipe lines, or it may be desired to vary the thickness of the mortar coating.

In accordance with the present invention, an improved construction for overcoming these difficulties, is provided in the form of a substantially frusto-conically shaped troweling element, preferably, although not necessarily, formed of three thin sheets of resilient metal shaped collectively to conform to a cone, the larger and trailing end portions of such element being adapted to engage under pressure and to smooth the conduit coating in the pipe, while the smaller end of such element comprises the leading end thereof. Side edge portions of the sheets which make up the frusto-conical element are arranged in circumferentially relatively slidable overlapping relation. Within the trailing end portions of the troweling element, an improved and exceptionally rugged and dependable yieldable supporting means is provided for applying pressure around within the interior of the troweling element, to urge same yieldably under pressure against the mortar lining, and this means is provided with anti-friction elements engaging the interior surfaces of the troweling element so as to leave the trailing end portions thereof quite freely (without excessive friction) to expand or contract by way of relative circumferential sliding of the overlapped portions of the sheets which make up the element.

According to another aspect of one embodiment of the invention, means is provided within the forward end of the frusto-conical troweling element for supporting same so as normally to have a predetermined diameter, and yet adjustable means are provided for moving the frusto-conical troweling element either forwardly or rearwardly along its supporting means, in such manner as to have the effect of either somewhat reducing the size of the element in radial directions, or alternatively of increasing such size, thereby consequently varying the size of the trailing end portions of the troweling element to accommodate variations in the actual inside diameter of the lining or of the pipe being lined. Also with this embodiment of the invention, provision is made for shifting either forwardly or rearwardly the yieldable supporting means within the trailing ends of the troweling element, if desired, and depending upon the adjustment which has been made of the size of the troweling element by the use of the supporting means within the forward end thereof.

Various further and more specific objects, features and advantages of the invention will appear from the description given below, taken in connection with the accompanying drawings, illustrating by way of example preferred forms of the invention.

Figure 1:
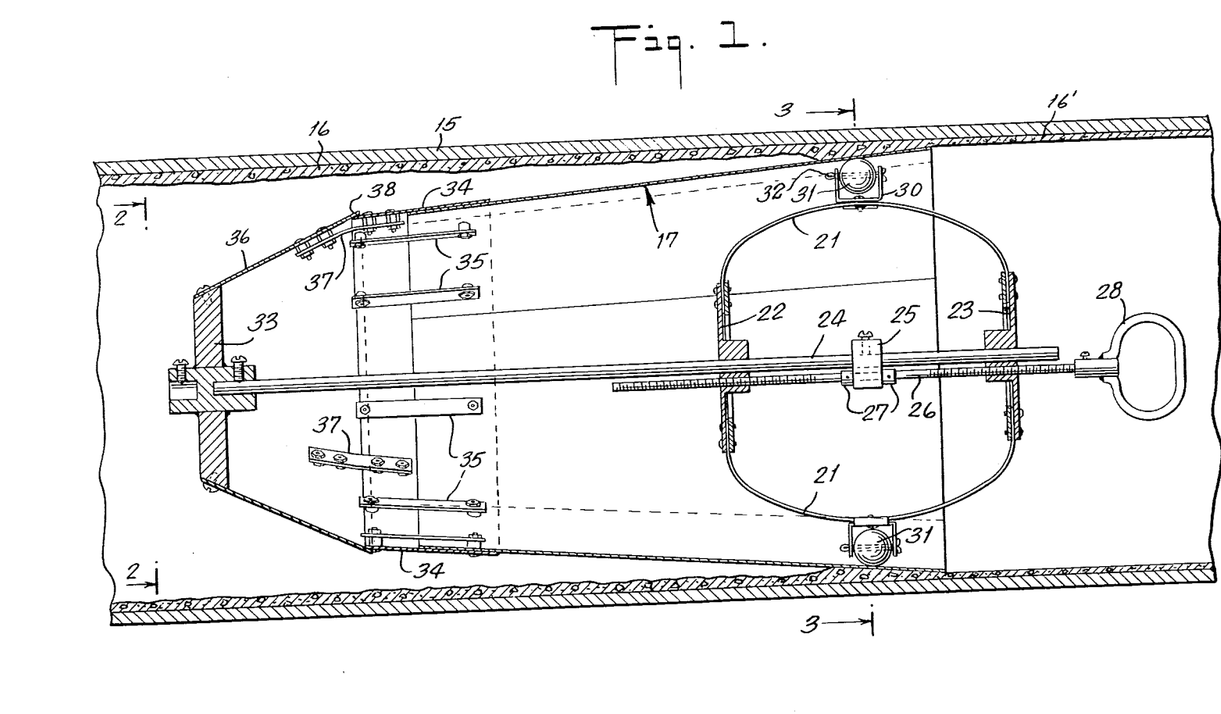
FIG. 1 is a vertical sectional view of one embodiment of the invention showing the troweling apparatus being dragged through a pipe which has just been lined with mortar.

Referring now to FIG. 1 in further detail, a pipe or conduit is shown in section at 15, same being lined, as indicated at 16 on its interior wall surfaces, with cement mortar which has just been deposited and which is to be troweled into smooth condition as indicated at 16'.

Figures 3, 5:
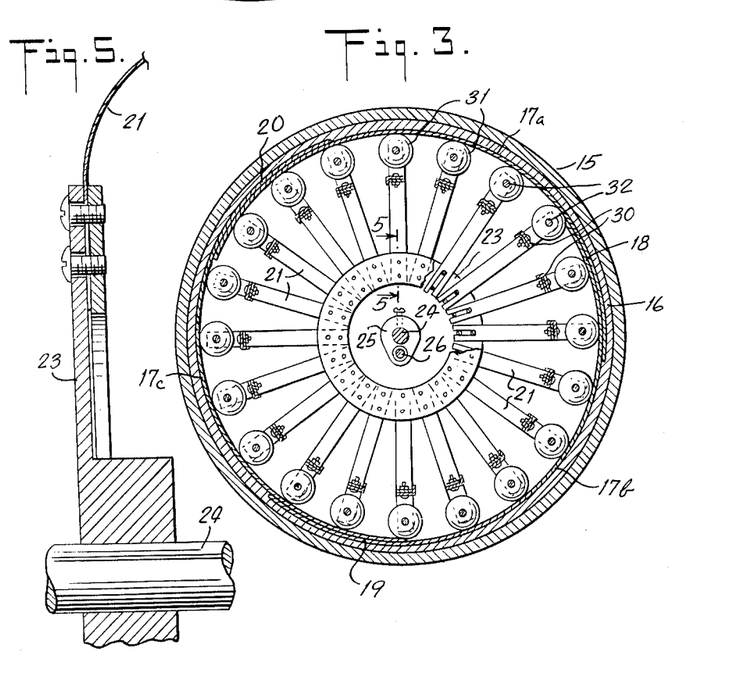
FIG. 5 is an enlarged sectional view of certain portions, taken substantially along line 5—5 of FIG. 3.

The troweling element itself (at 17) comprises preferably a plurality of "leaves" of thin resilient sheet metal, for example stainless steel, and as shown in section in FIG. 3, this element may be formed of three leaves 17a, 17b and 17c, the side edges of which are positioned circumferentially in relatively slidable overlapping relation, as indicated at 18, 19 and 20, so that together the leaves form a frusto-conical element, the trailing portions of which are variably expansible in diameter upon circumferential and relatively slidable movements of the leaves.

A plurality of generally U-shaped leaf spring elements, as at 21, are provided within the trailing end of the troweling element, each of these being positioned substantially in a radially-extending plane, the planes of each being at slight angles to each other, as shown in FIG. 3, whereby a multiplicity of such leaf spring elements is provided, which collectively present a bulging external surface conforming approximately or generally to the surface of a sphere, and since each of the leaf springs is yieldable, this assembly as a whole is yieldable, and same may be adjustably expanded or contracted in general size by means described below.

As further shown in FIG. 1, the ends respectively of each of the leaf springs 21, are secured as by screws to spaced-apart disks 22 and 23, which have hub portions slidably mounted upon an axially-extending rod 24. A collar member 25 may be affixed, as shown, by a set screw, at adjustable positions along this rod. Another rod 26 is rotatably mounted within member 25, this rod being held as by collars 27 against longitudinal movement with respect to member 25. Rod 26 at its end portions is threaded in opposite directions into engagement with hub portions of the members 22 and 23. Thus when the rod 26 is rotated, as by the use of a handle 28, the spacing between the members 22 and 23 may be adjusted, thereby causing the springs 21 either to bow or bulge more outwardly, or to be flexed inwardly, thus varying the pressure which the springs are able to exert outwardly.

Figures 2, 4:
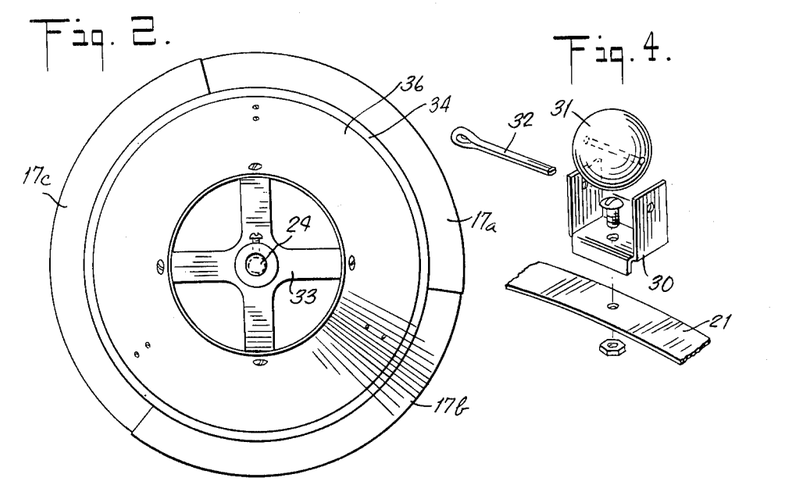
FIGS. 2 and 3 are vertical sectional views taken substantially along lines 2—2 and 3—3 of FIG. 1.
FIG. 4 shows in detail certain separated parts of the anti-friction means referred to above.

Each of the springs 21 at its mid-portion has secured thereon as by the use of a screw, fastening or bracket means, as shown at 30 in FIGS. 1 and 4, and anti-friction rotatable means, such as balls as indicated at 31, may be provided and held in place on the bracket means as by cotter pins 32. Each of these balls respectively as carried by one of the springs 21, is thus urged yieldably under pressure against the interior surface of the troweling element. And when the troweling element has occasion to expand or contract by circumferentially sliding movements at the overlapping portions of the leaves thereof, then by reason of this anti-friction means, such expansion or contraction will be quite free to take place even though springs 21 may be adjusted to exert quite substantial outward pressure.

The axial rod 24 may extend forwardly and be affixed to a rigid spider element 33, to which any suitable hook means or the like may be connected for connecting same to a cable or rod for dragging the trowel through the conduit being lined.

The forward portions of the troweling element 17 (as best shown in FIG. 1) are received within an annular sheet metal band member 34, somewhat frusto-conical in shape. The several leaves of the troweling element 17 may be attached and retained within the band 34 as by a plurality of spring-like straps 35, having their ends connected as by screws respectively to the leaves and to the band member and preferably these straps are in positions spaced somewhat from the inner surfaces of the leaves and of the band 34, so that the forward portions of the leaves are free to move to the extent necessary when the trailing end portions of the troweling element are adjusted or flexed to become either more expanded or contracted.

Preferably the forward end of the assembly is enclosed by a sheet metal frusto-conical housing element 36, the cone angle thereof being substantially greater than that of the troweling element 17. This housing means will serve to prevent foreign matter from entering the troweling element and fouling the parts, and will also serve to cause deflection of portions of the troweling elements 17 radially inward, in case obstructions should be encountered in the pipe being lined, such for example as nipples or connections to branch lines which may protrude into the pipe.

The forward end edges of the housing 36 may be secured as by screws to the rigid spider 33, as shown, while the trailing end edges thereof may be connected as by straps 37 to the forward portions of the annular band 34 and in such manner that the trailing edge of the housing 36 overlaps somewhat the forward edges of the band 34, as indicated at 38.

Reference will now be made to the embodiment of the invention shown in FIGS. 6–12. In this form the troweling element 40 is similar to the troweling element 17 of FIG. 1, except that preferably element 40 may be somewhat longer. The troweling element 40 as shown is formed of three "leaves" at 41, 42, 43 (see FIG. 9).

Figures 6, 7, 8:
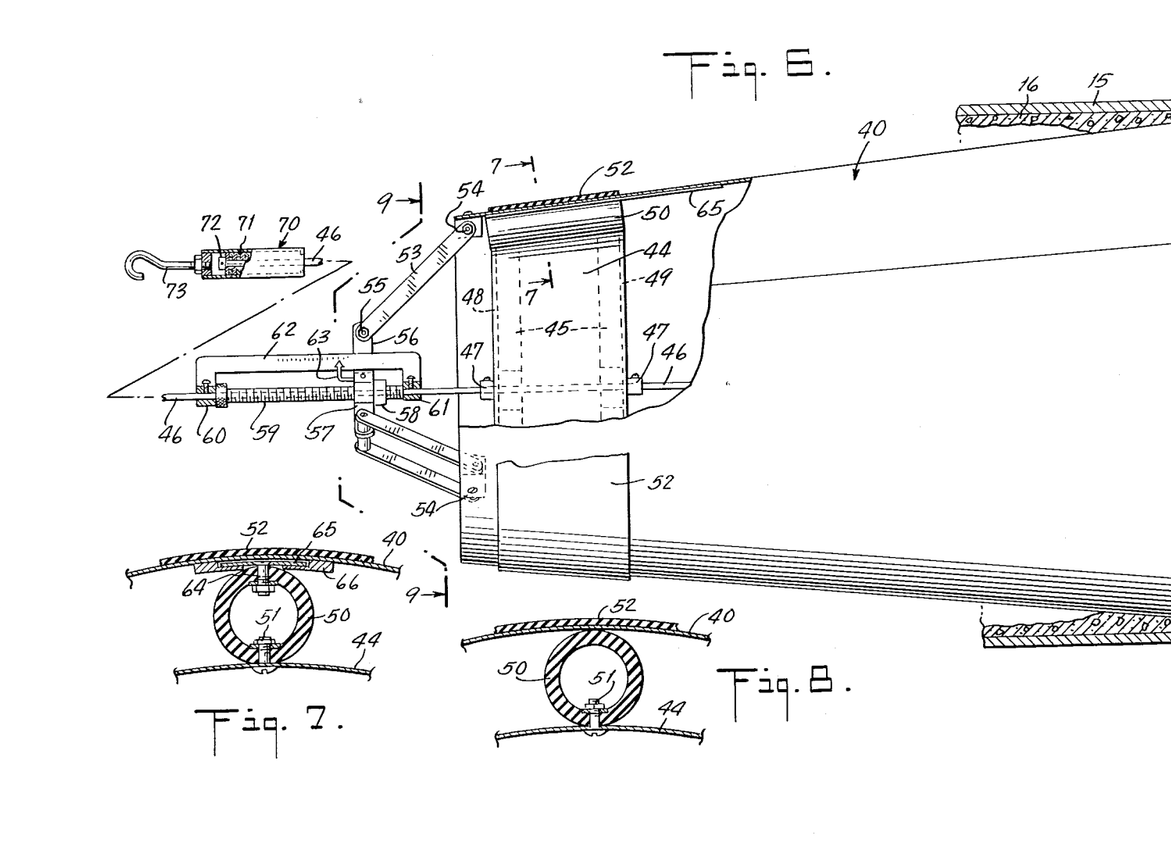
FIG. 6 is a side elevational view showing, with parts broken away in section, an alternative embodiment of the invention.
FIG. 7 is a sectional view taken substantially along line 7—7 of FIG. 6.
FIG. 8 is a sectional view, taken substantially along line 8—8 of FIG. 9.

Within the forward end portion of the troweling element 40, a relatively rigid stationary annular metal band 44 is provided, its outer surface being positioned in generally concentric relation with surface elements thereof parallel to elements of the frusto-conical troweling element. This band may be mounted on radially-extended struts as at 45, the inner ends of which are suitably attached to an axially-extending rod 46 for example by the use of flanged collar means as at 47 secured to the rod at adjustable positions therealong as by setscrews as shown. Annular rings 48, 49 may be secured as by screws to the outer ends of the struts 45 for interconnecting same and lending rigidity thereto, as well as to the metal band 44.

A plurality of short lengts of hose as at 50, formed of yieldable rubber or rubber-like material, are secured at angularly-spaced positions around externally of the band 44 and internally of the forward end portions of the troweling element 40. As shown in FIGS. 7 and 8, these hose lengths may each be secured to the band 44 as by small screw bolts 51 in position so that the outer surfaces of the hoses are in supporting relation with the interior surfaces of the troweling element 40. An elastic band 52 of ruber or rubber-like material is positioned around on the forward end of the troweling element 40 firmly to embrace same and hold same under pressure against the outer surfaces of the hoses 50.

Figure 9:
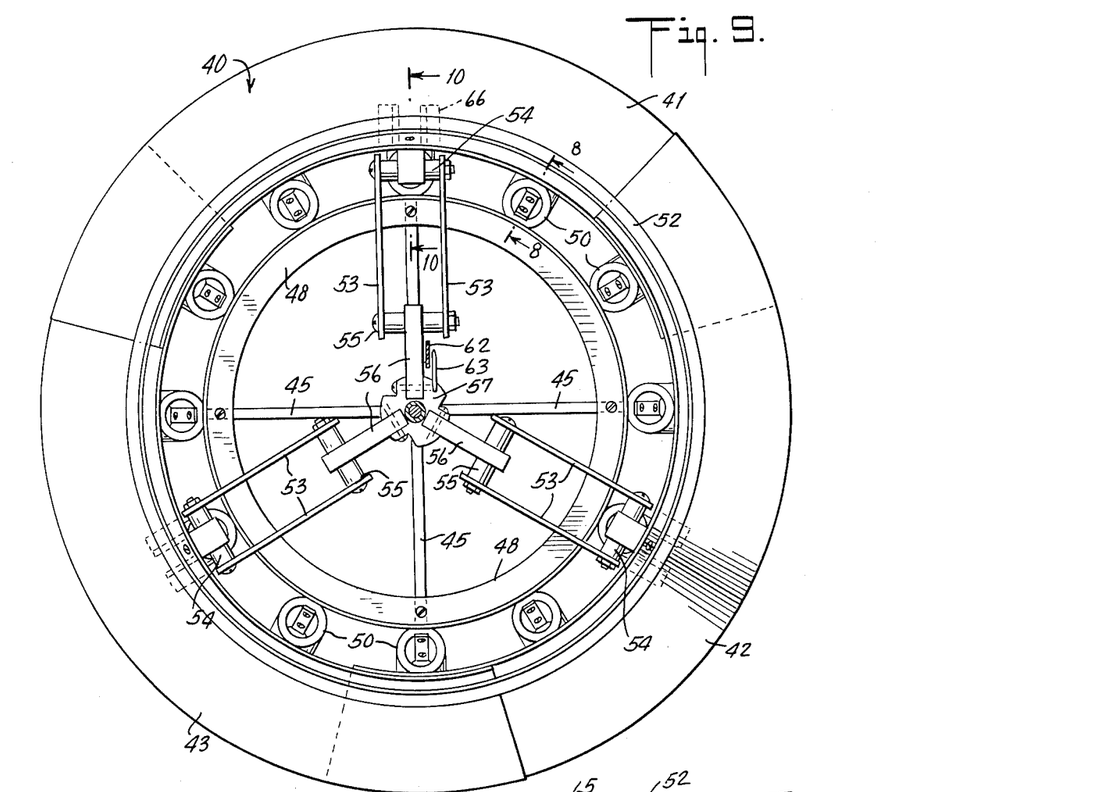
FIG. 9 is a sectional view taken substantially along line 9—9 of FIG. 6.
Figure 10:
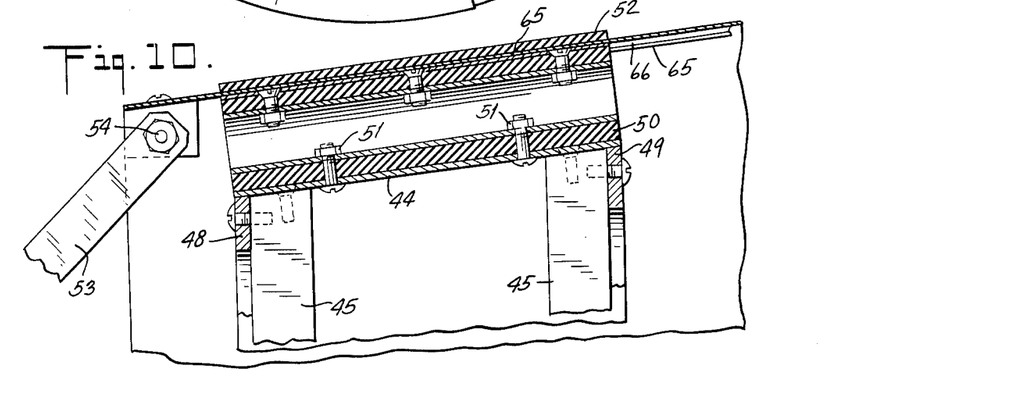
FIG. 10 is a sectional view taken substantially along line 10—10 of FIG. 9.

Means, as will now be described, are provided for adjustably moving either forwardly or rearwardly, the forward end portions of the troweling element 40 in slidable relation to the external surfaces of the hoses 50. This means, as best shown in FIGS. 6 and 9, may take the form of a plurality of pairs of links 53, the outer ends of which are pivotally connected, as by suitable means as at 54, to the forward end edges of the troweling means 40, and the inner portions of these links are directed inwardly and forwardly to suitable pivotal connections as at 55 to arms as at 56 which in turn are secured to a hub means 57. The hub means 57 contains a rotatable hollow internally-threaded thumbscrew 58 which has threaded engagement with a hollow rod 59. The latter rod is secured in a fixed position along the axially-extending pull rod 46 as by collars 60, 61 having setscrews engaging rod 46 and these collars may be interconnected by a rod or bar 62 bearing graduations of a scale which in conjunction with a pointer 63 mounted on the hub 57 will serve to indicate the degree of adjustment forwardly or rearwardly of the troweling element 40 and consequently this will give an effective indication of the diameter of the trailing edge portions of the troweling element.

At places where the pivotal connections 54 occur between the links 53 and the forward edge of the troweling element, the hoses 50 on their outer surfaces may be secured as by screw means 64 with respect to slide members 65 (FIG. 7 for example), which slide means is slidable within a groove of a portion 66 affixed to the interior surface of the troweling element 40.

Thus, by turning the thumbscrew 58 in a direction for example to move the pointer 63 forwardly, as shown in FIG. 6, this will cause the links 53 to pull forwardly on the trailing ends of the troweling element 40. As a consequence of pulling forwardly the leaves of the troweling element 40 as embraced by the encircling rubber band 52, the overlapping edges of the leaves will be circumferentially slidable on each other, whereby the troweling element will become contracted in size because of its movement along the surfaces of the hoses 50 toward portions of the hoses which are directed axially inwardly of the assembly. As a further consequence, the trailing end portions of the troweling element 40 will also become restricted to a smaller size. Conversely, if it is desired to increase the effective diameter of the trailing edge portions of the troweling element, then the thumbscrew 58 is adjusted in the opposite direction so that the links 53 will push the forward end edge portions of the troweling element rearwardly along the surfaces of the hoses 50.

As further shown in FIG. 6, the forward end of the pull rod 46 may be connected to means such as shown at 70 containing a series of compressible annular members 71 formed, for example, of rubber and alternate ones of which have larger or smaller holes therethrough to facilitate the compressibility of the series when the pull rod 46 through a medium of an end collar 72 thereon applies pressure thereto. The forward end of member 70 may be provided with hook means 73 for connection with a cable or the like for dragging the apparatus through a conduit. The yieldable compressible means 71 enables the troweling apparatus to be drawn forwardly smoothly without jerky movements from any cause which might cause ridges or the like to be formed on the troweled mortar surfaces.

The yieldable supporting arrangement within the trailing end portions of the troweling element of FIG. 6 are similar to the corresponding means in FIG. 1, like parts being identified by the same reference numerals. However, here the ends of the U-shaped springs 21 are preferably held by screws between disks, as at 75, and annular ring members, as at 76, the disks in turn at their mid-portions being respectively carried on hub members 77 and 78, each slidable on the axially-extending rod 46. The rod 26 is provided with oppositely threaded end portions engaging in the hubs 77 and 78 for the same purpose as in FIG. 1; that is, so that upon turning the handle 28', the spacings between the ends of the springs 21 may all be increased or decreased, thereby tending to flatten out the yieldable assembly made of the spring elements 21, or to cause same to expand by bulging for increasing the pressure against the anti-friction elements 31, and thence against the interior surfaces of the troweling element.

Figures 11, 12:
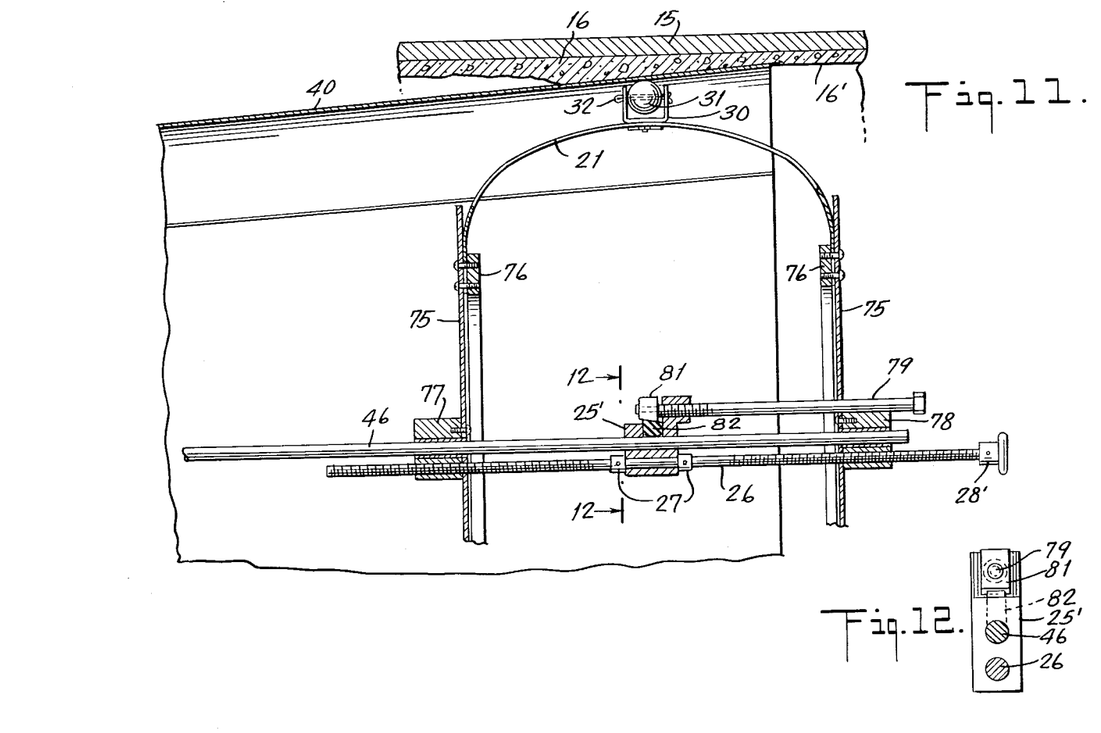
FIG. 11 is a vertical sectional view showing certain of the parts within the trailing end portions of the embodiment of FIG. 6.
FIG. 12 is a sectional view taken substantially along line 12—12 of FIG. 11.

However, a further adjustment is provided (as shown by FIG. 11) in addition to that shown in FIG. 1. That is, the member 25' may be adjusted along the rod 46 by pulling or pushing on the head of a bolt or rod member 79, thereby causing the whole yieldable assembly of the springs 21 to be moved forwardly or rearwardly within the troweling element. Thus when, for example, the means above described within the forward ends of the troweling element are shifted to draw the troweling element forwardly, then the rod 79 may be longitudinally adjusted so as correspondingly to shift the assembly of the bulging springs 21 forwardly. Thereby the distance between the anti-friction elements 31 and the trailing end edges of the troweling element, may be kept at its optimum. After the assembly of the springs 21 has been thus adjusted in position, one may turn the rod 79, which has threaded engagement at 80 with the member 25', whereby rod 79 will cause a wedge piece 81 thereon to advance toward the left, and thus urging another wedge piece 82 (which may be formed of plastic material) into tight engagement with the rod 46 to hold the assembly against further displacement.

Figure 13:
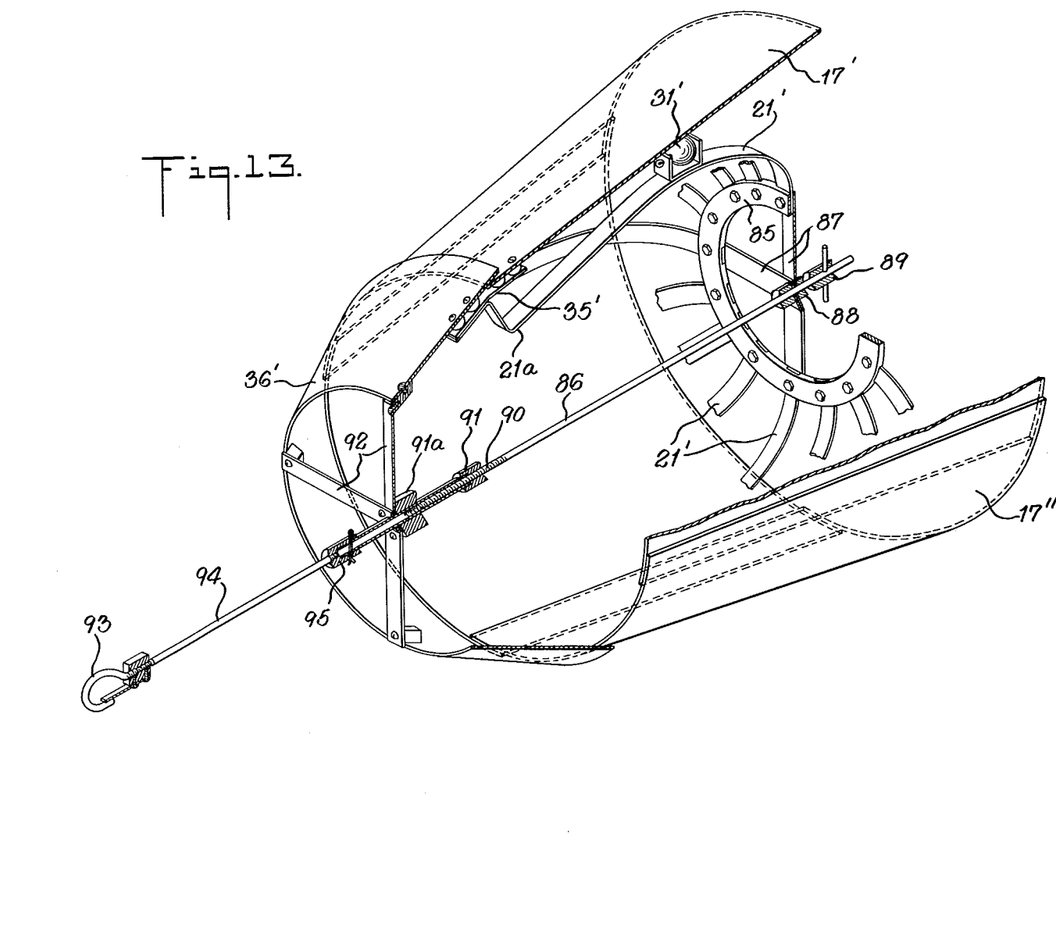
FIG. 13 comprises a perspective view with parts broken away showing an alternative embodiment of the invention.
Figure 14:
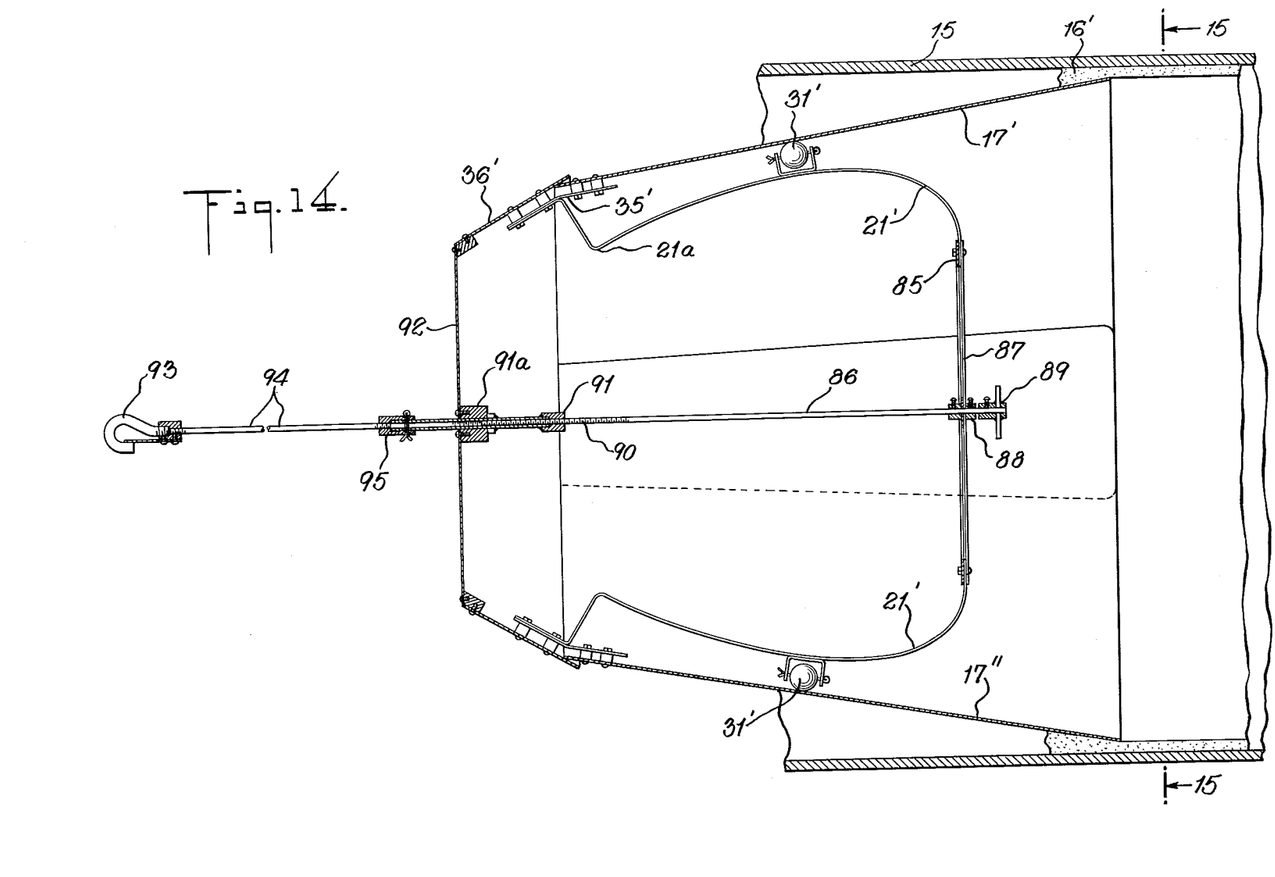
FIG. 14 is a longitudinal vertical sectional view of the embodiment of FIG. 13.
Figure 15:
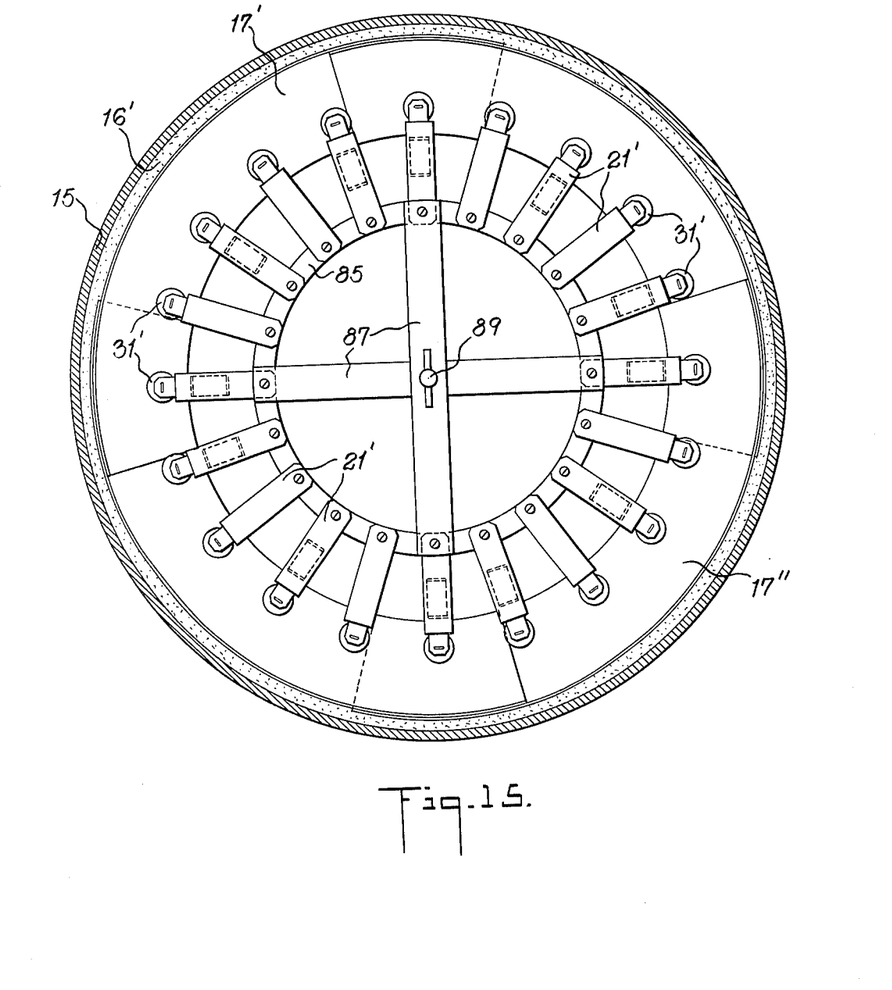
FIG. 15 is a vertical transverse sectional view thereof.

The embodiment of the invention shown in FIGS. 13–15 is generally similar to that shown in FIG. 1 and corresponding parts are identified by the same reference numerals but accompanied by prime marks.

One of the principal differences in the form shown in FIGS. 13–15 as compared with FIG. 1 resides in the fact that the springs 21' which carry the anti-friction rotatable balls 31', are in each case brought forward and so shaped as indicated at 21a as to be attached to the frusto-conical forward housing element 36'. Such attachment of the springs to member 36' can be accomplished by using the same bolts or screws which attach the straps 35' to the member 36'. Thus, with the form shown in FIGS. 13–15, no disk means such as shown at 22 in FIG. 1 is necessary for supporting the forward ends of the springs. The trailing ends of the springs 21 however may be secured as by bolts or screws to an annular member 85 which in turn is supported with respect to a central shaft 86 by a plurality of arms or strips 87 affixed to a collar member 88 which in turn is slidably mounted on the shaft or rod 86. The rod 86 carries suitable manual rotatable means 89 which may be used for adjusting longitudinally the position of the rod by reason of the threaded connection at 90 of the rod with respect to a surrounding internally threaded piece 91, 91a which is affixed to strap members as at 92 for supporting the forward end of the housing member 36'. The forward end of the apparatus may carry suitable hook means as at 93 supported on an axially extending rod 94 which may be detachably secured by any suitable means such as indicated at 95 with respect to a hollow rod extension in the members 91, 91a.

Thus, by manually turning the rod 86, the trailing end portions of the assembly constituted of the springs 21' may be adjusted forwardly or rearwardly with respect to the rod 86 thereby to increase or decrease respectively the extent of the bulging formation of the springs 21'. This will serve to permit adjustment of the pressure which the anti-friction balls 31' exert against the interior of the leaves as at 17, 17" which form the resilient sheet metal troweling element.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for troweling coated interior surfaces of pipes and the like, comprising: a substantially frusto-conically shaped troweling element formed of resilient sheet material, the larger end of said element comprising the trailing end thereof and being adapted to engage under pressure and to smooth the pipe coating, while the smaller end of said element comprises the leading end thereof, said element being formed of one or more leaves, the longitudinal edges of which circumferentially and relatively slidably overlap; and a yieldable generally bulging assembly for applying radially outward pressure to the interior surfaces of said troweling element at locations around within same near said trailing end thereof, said assembly carrying at spaced points around its periphery, anti-friction elements which engage and apply the pressure to the interior of the troweling element.

2. Apparatus in accordance with the foregoing claim 1 and in which said anti-friction elements comprise ball-like members rotatably mounted about axes extending generally longitudinally of the apparatus.

3. Apparatus for troweling coated interior surfaces of pipes and the like, comprising: a substantially frusto-conically shaped troweling element formed of resilient sheet material, the larger end of said element comprising the trailing end thereof and being adapted to engage under pressure and to smooth the pipe coating, while the smaller end of said element comprises the leading end thereof, said element being formed of one or more leaves, the longitudinal edges of which circumferentially and relatively slidably overlap; a yieldable generally bulging assembly for applying radially outward pressure to the interior surfaces of said troweling element at locations around within same near said trailing end thereof, spaced-apart supporting means for said assembly, one in advance of the other; rod means extending axially of the apparatus and on which said supporting means are carried; said assembly including a plurality of springs having their ends connected respectively to said supports and with the mid-portions of the springs bulging radially outward, such springs extending generally along planes positioned respectively at angularly-spaced locations about said rod means; and elements carried at the bulging portions of each of said springs and which have anti-friction engagement with the interior surface of the troweling element for applying pressure thereto.

4. Apparatus for troweling coated interior surfaces of pipes and the like, comprising: a substantially frusto-conically shaped troweling element formed of resilient sheet material, the larger end of said element comprising the trailing end thereof and being adapted to engage under pressure and to smooth the pipe coating, while the smaller end of said element comprises the leading end thereof, said element being formed of one or more leaves, the longitudinal edges of which circumferentially and relatively slidably overlap; a yieldable generally bulging assembly for applying radially outward pressure to the interior surfaces of said troweling element at locations around within same near said trailing end thereof, said assembly including a pair of spaced-apart supports one in advance of the other; a rod extending axially of the apparatus and on which said supports are carried, at least one of said supports being slidable along said rod; a plurality of generally U-shaped springs having their ends connected respectively to said supports with the mid-portions of the springs bulging radially outward, such springs extending generally along planes positioned respectively at angularly spaced locations about said rod; and means for adjusting the spacing of said supports along said rod, thereby to adjust the amount of bulging of said springs.

5. Apparatus for troweling coated interior surfaces of pipes and the like comprising: a substantially frusto-conically shaped troweling element formed of resilient sheet material, the larger end of said element comprising the trailing end thereof and being adapted to engage under pressure and to smooth the pipe coating, while the smaller end of said element comprises the leading end thereof, said element being formed of one or more leaves, the longitudinal edges of which circumferentially and relatively slidably overlap; a yieldable generally bulging assembly of spring means for applying radial outward pressure to the interior surfaces of said troweling element at locations around within said trailing end thereof; supporting means extending generally axially of the apparatus, on which said assembly is carried; and means for releasably affixing said assembly at adjustable positions with respect to said troweling element along said supporting means.

6. Apparatus in accordance with the foregoing claim 5 and in which means are provided along said supporting means for adjustably varying the degree of bulging of said assembly.

7. Apparatus for troweling coated interior surfaces of pipes and the like comprising: a substantially frusto-conically shaped troweling element formed of resilient sheet material, the larger end of said element comprising the trailing end thereof and being adapted to engage under pressure and to smooth the pipe coating, while the smaller end of said element comprises the leading end thereof, said element being formed of one or more leaves, the longitudinal edges of which circumferentially and relatively slidably overlap; an axially-extending rod means along which said apparatus is mounted; means supported with respect to said rod means and mounted within said leading end of the troweling element and resiliently supporting the interior surfaces thereof at angularly-spaced points around within the troweling element; means externally embracing said leading end of the troweling element to hold same in contact with said resilient supporting means, while permitting longitudinal adjusting movement of the troweling element on said supporting means; and mechanism adjustable forwardly and rearwardly along said rod means and connected to the leading end of said troweling element for adjusting the position of the same forwardly and rearwardly along said resilient supporting means, thereby causing restriction or expansion of the size of such frusto-conical troweling element.

8. Apparatus for troweling coated interior surfaces of pipes and the like comprising: a substantially frusto-conically shaped troweling element formed of resilient sheet material, the larger end of said element comprising the trailing end thereof and being adapted to engage under pressure and to smooth the pipe coating, while the smaller end of said element comprises the leading end thereof, said element being formed of one or more leaves, the longitudinal edges of which circumferentially and relatively slidably overlap throughout; means positioned at the leading end of said element and in supporting engagement therewith around within the interior surface thereof; means for embracing the leading end portions of the troweling element and for retaining same in engagement with such supporting means, while permitting longitudinal slidable movements of the troweling element therealong; and means for adjusting the position of the troweling element forwardly and rearwardly of said supporting means, thereby to constrict or expand the size of the frusto-conical troweling element.

9. Apparatus in accordance with the foregoing claim 8 and in which said supporting means includes a plurality of yieldable hose-like members engaging respectively the interior surface of the troweling element along at angularly-spaced positions.

10. Apparatus for troweling coated interior surfaces of pipes and the like, comprising: a substantially frusto-conically shaped troweling element formed of resilient sheet material, the larger end of said element comprising the trailing end thereof and being adapted to engage under pressure and to smooth the pipe coating, while the smaller end of said element comprises the leading end thereof, said element being formed of one or more leaves, the longitudinal edges of which circumferentially and relatively slidably overlap throughout; an axially-extending member along on which said apparatus is mounted; means at a predetermined position on said member at the leading end of said troweling element for supporting the latter while permitting longitudinally slidable movements thereof; and linkage means mounted in adjustable position along said member and connected to the leading end of the troweling element for slidably adjusting the position of the troweling element forwardly or rearwardly with respect to said supporting means, thereby in effect to constrict or expand the size of the frusto-conical troweling element.

11. Apparatus for troweling coated interior surfaces of pipes and the like, comprising: a substantially frusto-conically shaped troweling element formed of resilient sheet material, the larger end of said element comprising the trailing end thereof and being adapted to engage under pressure and to smooth the pipe coating, while the smaller end of said element comprises the leading end thereof, said element being formed of one or more leaves, the longitudinal edges of which circumferentially and relatively slidably overlap; a yieldable generally bulging assembly for applying radially outward pressure to the interior surfaces of said troweling element at locations around within same, rod means extending axially of the apparatus, said bulging assembly comprising a plurality of springs extending generally along planes positioned respectively at angularly-spaced locations about said rod means, means adjustable along said rod means for carrying the trailing ends of said springs, a frusto-conical housing member to which the forward end of said troweling element is attached, means for supporting said housing member on said rod means, the forward ends of said springs being secured to said housing member.

12. Apparatus for troweling coated interior surfaces of pipes and the like, comprising: a substantially frusto-conically shaped troweling element formed of resilient sheet material, the larger end of said element comprising the trailing end thereof and being adapted to engage under pressure and to smooth the pipe coating, while the smaller end of said element comprises the leading end thereof, said element being formed of one or more leaves, the longitudinal edges of which circumferentially and relatively slidably overlap; axially extending rod means on which the apparatus is mounted, a plurality of anti-friction elements contacting the interior of said troweling element at circumferentially spaced points around within same and yieldable means for supporting each of said anti-friction elements, said yielding means being supported at least in part by said rod means and being spring biased in a direction to maintain said anti-friction elements under pressure against the interior of the troweling element, and said yielding means being adjustable longitudinally of the rod means to increase or decrease the biasing pressure.

References Cited by the Examiner

UNITED STATES PATENTS

| | | | |
|---|---|---|---|
| 458,892 | 9/1891 | Ford | 15—104.19 |
| 528,132 | 10/1894 | Jess | 15—104.19 |
| 1,147,374 | 7/1915 | Coe | 25—38 |
| 2,517,780 | 8/1950 | Frank | 25—38 |
| 2,555,377 | 6/1951 | Scott | 25—38 |
| 2,987,794 | 6/1961 | Perkins | 25—38 |

J. SPENCER OVERHOLSER, *Primary Examiner.*

G. A. KAP, *Assistant Examiner.*